(12) United States Patent
Konrad et al.

(10) Patent No.: US 7,588,816 B2
(45) Date of Patent: Sep. 15, 2009

(54) BIAXIALLY ORIENTED POLYESTER FILM FOR HEAT-METAL LAMINATION

(75) Inventors: Matthias Konrad, Hofheim (DE); Bodo Kuhmann, Runkel (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 85 days.

(21) Appl. No.: 11/748,092

(22) Filed: May 14, 2007

(65) Prior Publication Data

US 2007/0269649 A1 Nov. 22, 2007

(30) Foreign Application Priority Data

May 18, 2006 (DE) ........................ 10 2006 023 293

(51) Int. Cl.
*B32B 7/12* (2006.01)
*B32B 15/09* (2006.01)
*B32B 27/20* (2006.01)
*B32B 27/36* (2006.01)
*B32B 37/16* (2006.01)

(52) U.S. Cl. .................... 428/141; 428/323; 428/423.1; 428/423.7; 428/425.8; 428/457; 428/458; 428/480; 428/910; 528/302; 528/308; 528/308.6; 156/297; 156/331.7

(58) Field of Classification Search ........................ None
See application file for complete search history.

(56) References Cited

U.S. PATENT DOCUMENTS

| | | | |
|---|---|---|---|
| 3,884,870 A * | 5/1975 | Dodson et al. .............. 523/220 |
| 3,980,611 A * | 9/1976 | Anderson et al. ........... 523/220 |
| 4,252,885 A | 2/1981 | McGrail et al. |
| 4,493,872 A * | 1/1985 | Funderburk et al. ......... 428/332 |
| 4,818,581 A * | 4/1989 | Katoh et al. ................. 428/143 |
| 5,137,762 A * | 8/1992 | Aizawa et al. ............. 428/35.8 |
| 5,478,632 A * | 12/1995 | Kurz et al. ................... 428/212 |
| 5,498,454 A * | 3/1996 | Kuze et al. ................. 428/35.9 |
| 5,529,832 A * | 6/1996 | Masuda et al. .............. 428/212 |
| 5,686,510 A * | 11/1997 | Asai et al. ................... 523/220 |
| 5,753,328 A * | 5/1998 | Miyazawa et al. ......... 428/35.8 |
| 5,759,651 A * | 6/1998 | Machii et al. .............. 428/35.8 |
| 5,846,642 A * | 12/1998 | Kimura et al. .............. 428/323 |
| 6,071,599 A * | 6/2000 | Kosuge et al. .............. 428/213 |
| 6,127,473 A * | 10/2000 | Yoshida et al. ............. 524/493 |
| 6,149,995 A * | 11/2000 | Peiffer et al. ............... 428/35.8 |
| 6,162,527 A * | 12/2000 | Ogawa et al. ............... 428/141 |
| 6,214,440 B1 * | 4/2001 | Peiffer et al. ............... 428/141 |
| 6,423,401 B2 * | 7/2002 | Peiffer et al. ............... 428/216 |

(Continued)

FOREIGN PATENT DOCUMENTS

EP 0 144 878 A2 6/1985

(Continued)

*Primary Examiner*—Vivian Chen
(74) *Attorney, Agent, or Firm*—ProPat, L.L.C.

(57) ABSTRACT

The invention relates to biaxially oriented polyester films which are suitable for lamination to sheet metal; the invention in particular relates to a polyester film which (based on the weight of polyester) comprises from 1 to 8% by weight of isophthalate-derived units, and also comprises not only particles whose median diameter is from 0.1 to 2.0 μm but also particles whose median diameter is from >2.5 μm to <8 μm. The invention further relates to a process for production of these films and to their use.

7 Claims, 1 Drawing Sheet

U.S. PATENT DOCUMENTS

| | | | |
|---|---|---|---|
| 6,524,719 B1 * | 2/2003 | Yamane et al. | 428/474.7 |
| 6,761,968 B2 * | 7/2004 | Kusume et al. | 428/328 |
| 6,780,482 B2 * | 8/2004 | Majima et al. | 428/35.8 |
| 6,797,359 B2 * | 9/2004 | Janssens et al. | 428/141 |
| 6,855,395 B2 * | 2/2005 | Janssens et al. | 428/141 |
| 6,878,442 B1 * | 4/2005 | Igushi et al. | 428/357 |
| 2005/0238845 A1 * | 10/2005 | Kuroda et al. | 428/141 |

FOREIGN PATENT DOCUMENTS

| | | |
|---|---|---|
| EP | 0 296 620 A2 | 12/1988 |
| EP | 0 474 240 B1 | 3/1992 |
| EP | 0 586 161 A1 | 3/1994 |
| EP | 1 086 979 A1 | 3/2001 |
| EP | 1 176 163 A2 | 1/2002 |
| EP | 1 380 415 A1 | 1/2004 |
| EP | 1 442 876 A1 | 8/2004 |
| JP | 11 158301 | 6/1999 |
| JP | 11-158301 * | 6/1999 |
| JP | 2000 177085 | 6/2000 |
| WO | WO 94/13476 A1 | 6/1994 |
| WO | WO00/46026 * | 8/2000 |

* cited by examiner

Analysis of elevations (> 0.5 μm), these having white margins in the plan view of the surface

BIAXIALLY ORIENTED POLYESTER FILM FOR HEAT-METAL LAMINATION

CROSS-REFERENCE TO RELATED APPLICATIONS

This application claims priority to German Patent Application 10 2006 023 293.3 filed May 18, 2006 which is hereby incorporated herein by reference in its entirety.

FIELD OF THE INVENTION

The invention relates to biaxially oriented polyester films which are suitable for lamination to sheet metal; the invention in particular relates to a polyester film which (based on the weight of polyester) comprises from 1 to 8% by weight of isophthalate-derived units, and also comprises not only particles whose median diameter is from 0.1 to 2.0 µm but also particles whose median diameter is >2.5 µm. The invention further relates to a process for production of these films.

BACKGROUND OF THE INVENTION

Polyester films have many varied application sectors because they have excellent optical and mechanical properties. One application sector is sheet-metal lamination, in which the polyester film is laminated to sheet metal.

Lamination takes place in order to protect the sheet metal from corrosion, or for decorative purposes (printing). In the case of cans which are produced from film-laminated sheet metal, the film laminated to the inner side serves as barrier between packaged product and metal. The film therefore firstly inhibits diffusion of corrosive constituents of the packaged product to the metal and secondly inhibits diffusion of corrosion products into the packaged product. A film laminated to the outer side serves not only for corrosion protection but also generally for decorative purposes, a particularly effective promotional method here being reverse printing, which simultaneously protects the print.

Sheet-metal-film laminates are usually produced by, for example, combining a multilayer, sealable film with sheet metal heated to a high temperature. In another possible method, the film is adhesive-bonded to the sheet metal. Here, solvent-based adhesives or hot-melt adhesives are used. The films according to the present invention are particularly suitable for lamination by means of the hot-melt adhesive.

EP-B-474 240 describes polyester films for sheet-metal lamination which comprise particles whose average diameter is smaller than or equal to 2.5 µm. The films are comprised of a copolyester whose melting point is from 210 to 245° C. The examples mention copolyesters whose isophthalic content is from 9 to 12 mol %. The laminated sheet metal is processed to give deep-draw cans for food packaging.

EP-A-586 161 describes polyester films for lamination to sheet metal which comprise a copolyester whose melting point is from 210 to 245° C. and two particles of different size with average diameter of from 0.05 to 0.6 µm and from 0.3 to 2.5 µm. The laminated sheet metal is processed to give deep-draw cans for food packaging. The films are intended to have good heat resistance and are intended not to alter the taste of the contents.

EP-A-1 086 979 describes polyester films suitable for lamination to sheet metal via melting. The films are comprised of a copolyester which contains less than or equal to 18 mol % of isophthalic acid and porous particles whose average diameter is from 0.1 to 2.5 µm. The roughness ($R_a$) of the films in the examples is from 12 to 30 nm.

EP-A-1 176 163 describes films which are comprised of at least 90% by weight of a thermoplastic polyester and which comprise particles smaller than 0.1 µm and/or particles larger than 1 µm.

The films of the prior art are disadvantageous because they either provide an inadequate barrier with respect to metal ions or have excessive water-permeability, or have excessive flavor absorption. They also have inadequate mechanical strength, leading by way of example to problems in printing. Because roughness is low, the films have poor windability and sheet metal laminated to these films is difficult to remove from a stack.

SUMMARY OF ADVANTAGEOUS EMBODIMENTS OF THE INVENTION

An object was therefore to provide a biaxially oriented polyester film which is particularly suitable for hot-melt-adhesive laminates. The film is intended to provide a high barrier with respect to metal ions, and to have low water-permeability, and low flavor absorption. It is also intended to have mechanical strength, be easy to wind, and have scratch resistance; finally, it is intended that sheet metal laminated to this film should be easy to remove from a stack. The film is in particular intended to have the following properties:

water vapor permeation

<20 g/(m$^2$·d) H$_2$O at 15 µm film thickness, 23° C., 50% r.h. (DIN 53122)

oxygen permeation

<100 cm$^3$/(m$^2$·d·bar) O$_2$ at 15 µm film thickness (DIN 53380)

hydrogen sulfide permeation

<860 cm$^3$/(m$^2$·d·bar) H$_2$S at 15 µm film thickness (DIN 53380)

tensile strain at break in one direction (MD or TD)

>150% (ISO 527-1/527-2)

modulus of elasticity in one direction (MD or TD)

<4500 N/mm$^2$, preferably >3000 N/mm$^2$ (ISO-527-1)

shrink in both directions (MD and TD)

<1.8%, >0% (DIN 40634)

residual tensile strain

>40% (internal method)

density

>1.388<1.400 g/cm$^3$ (ASTM D1505-68 method C)

planar orientation Δp

<0.140 (internal method)

roughness $R_a$

>35 nm, preferably <100 nm (DIN 4762 cut-off 0.25 mm)

roughness $R_t$

>350 nm, preferably <1500 nm (DIN 4762 cut-off 0.25 mm)

topography 100-400 elevations/mm$^2$>0.5 µm and <5 µm (internal method)

haze

<10% (ASTM D1003-61 method A)

This object is achieved via a biaxially oriented polyester film, where the polyester is comprised of at least 80% by weight of ethylene-terephthalate-derived units and of from 1 to 8% by weight of ethylene-isophthalate-derived units (based in each case on the total weight of polyester), and where the film comprises particles whose median diameter $d_{50}$ is from 0.1 to 2.0 μm and particles whose median diameter $d_{50}$ is from >2.5 μm to <8 μm.

DETAILED DESCRIPTION OF ADVANTAGEOUS EMBODIMENTS OF THE INVENTION

Figure 1:
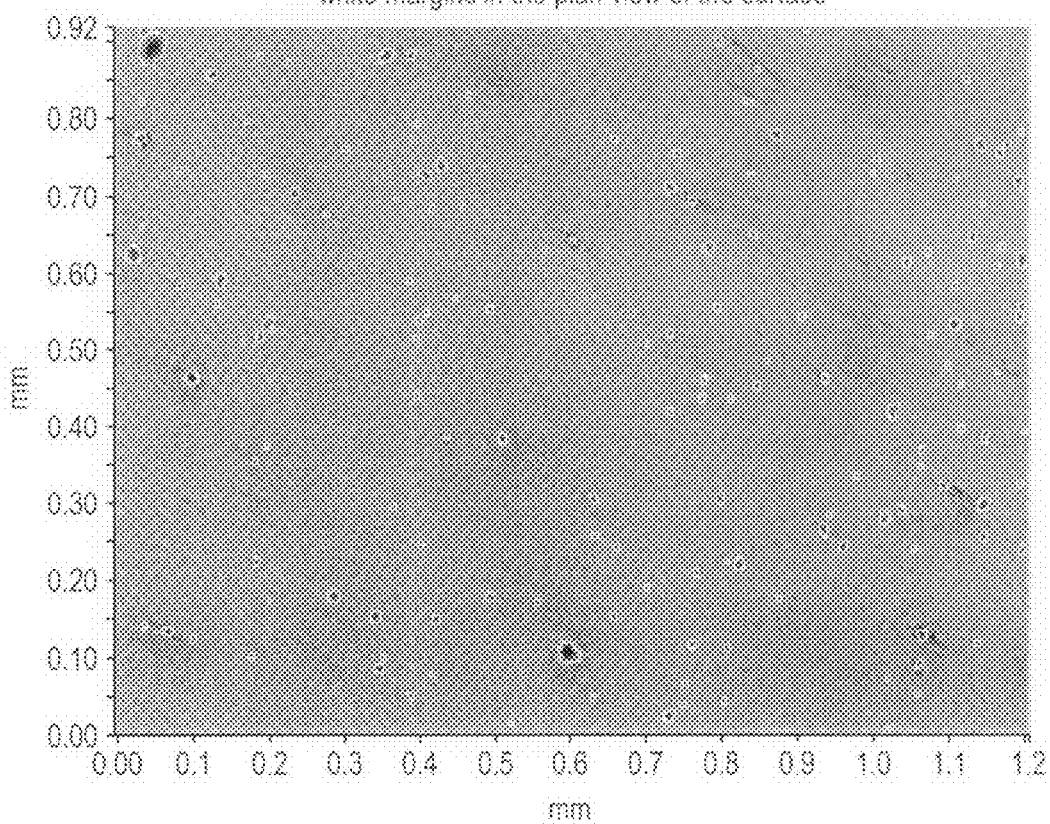
FIG. 1 is a plan view illustration of the surface of an exemplary topography specimen in which elevations greater than 0.5 microns have white margins.

The inventive polyester film is comprised of polyester and of additives. The polyester is comprised of at least 80% by weight, preferably at least 85% by weight, particularly preferably at least from 90 to 92% by weight, of ethylene-terephthalate-derived units and from 1 to 8% by weight, preferably from 2 to 7% by weight, particularly preferably from 3 to 6% by weight, of ethylene-isophthalate-derived units (based in each case on the total weight of polyester). If polyesters are used whose content of ethylene-isophthalate-derived units is lower than 1% by weight, the formability of the films is then inadequate for suitability as sheet-metal lamination films. This is attended by inadequate tensile strain at break. If polyesters are used whose content of ethylene-isophthalate-derived units is higher than 8% by weight, the flavor-barrier and migration properties (water vapor barrier, gas barrier) of the film become impaired. Furthermore, the mechanical properties of the film become impaired, this being discernible by way of example in impaired processibility of the film (for example greater susceptibility to tearing).

The remaining monomer units are derived from other aliphatic or cycloaliphatic diols and, respectively, dicarboxylic acids.

Examples of suitable other aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol).

Examples of other cycloaliphatic dicarboxylic acids are cyclohexanedicarboxylic acids, in particular cyclohexane-1,4-dicarboxylic acid. Among the aliphatic dicarboxylic acids, the ($C_3$-$C_{19}$) alkanediacids are particularly suitable, and the alkane moiety here can be straight-chain or branched.

One way of preparing the polyesters is the transesterification process. Here, the starting materials are dicarboxylic diesters and diols, which are reacted using the customary transesterification catalysts, such as the salts of zinc, of calcium, of lithium, of magnesium or of manganese. The intermediates are then polycondensed in the presence of well known polycondensation catalysts, such as antimony trioxide or titanium salts. Another equally good preparation method is the direct esterification process in the presence of polycondensation catalysts. This starts directly from the dicarboxylic acids and the diols. Inventive polyesters are commercially available products.

Additives below mean stabilizers, such as UV stabilizers, antioxidants, hydrolysis stabilizers, flame retardants, and also dyes and color pigments. However, additives in the present case are in particular particles (also called antiblocking agents), e.g. silicon dioxide particles (amorphous or crystalline), silicates, such as calcined clays, titanium dioxide, barium sulfate, calcium carbonate particles, or organic, if appropriate crosslinked particles. It is preferable to use silicon dioxide particles, particularly amorphous silicon dioxide particles.

The invention uses particles having two different median diameters $d_{50}$, firstly small particles whose median diameter $d_{50}$ is from 0.1 to 2.0 μm, preferably from 0.2 to 1.9 μm, particularly preferably 0.3 to 1.8 μm, and secondly large particles whose median diameter $d_{50}$ is from >2.5 μm to <8 μm, preferably from 3 to 7 μm, particularly preferably from 4 to 6 μm. If small particles whose median diameter is smaller than 0.1 μm are used, the fundamental roughness of the film is then insufficient to provide the slip properties demanded. If the small particles are larger than 2.0 μm, the slip properties of the film are again impaired, since the distances between the individual elevations on the film are then too great and the film has greater susceptibility toward blocking. If the amount of these particles used is greater, then the haze of the film is impaired. If large particles are used whose median diameter is smaller than or equal to 2.5 μm, the individual laminated sheets of sheet metal cannot then easily be removed from the stack, and the windability of the film is impaired. If the size of the large particles is greater than or equal to 8.0 μm, there is a risk of perforation during the deep-draw procedure (impairment of barrier properties); the film also becomes more difficult to produce, since it has greater susceptibility toward break-offs.

The particles are advantageously added in the form of dispersion in ethylene glycol during preparation of the polyester. To this end, a slurry of the particles in ethylene glycol is subjected to light grinding and dispersed using ultrasound. The median diameter $d_{50}$ of the particles is determined on this dispersion and corresponds to the median diameter of the particles in the film.

The amount advantageously used of the small particles is from 0.01 to 0.5% by weight, preferably from 0.05 to 0.35% by weight, particularly preferably from 0.08 to 0.2% by weight (based on the weight of the polyester of the film layer in which the particles are used).

The amounts advantageously used of the large particles is from 0.01 to 0.5% by weight, preferably from 0.015 to 0.3% by weight, particularly preferably from 0.02 to 0.25% by weight (based on the weight of the polyester in the film layer in which the particles are used).

The total thickness of the inventive polyester film can vary within certain limits. It is from 10 to 150 μm, in particular from 12 to 100 μm, preferably from 15 to 75 μm.

Production Process

The invention further provides a process for production of the inventive polyester film by the extrusion process known per se.

For the purposes of this process, the procedure is that a polymer melt is extruded with the constitution stated above through a flat-film die, the resultant film is drawn off for solidification on one or more rolls, the film is then biaxially stretched (oriented), the biaxially stretched film is heat-set and, if appropriate, is corona- or flame-treated on the surface intended for treatment.

The biaxial orientation is generally carried out sequentially, preferably orienting first longitudinally (i.e. in the machine direction=MD) and then transversely (i.e. perpendicularly to the machine direction=TD). This gives orientation of the molecular chains. The longitudinal orientation can be carried out with the aid of two or more rolls running at different speeds corresponding to the desired stretching ratio. For the transverse orientation use is generally made of an appropriate tenter frame. The temperature at which the orientation is carried out may vary over a relatively wide range. The longitudinal stretching is generally carried out at from 80 to 140° C., and the transverse stretching at from 90 to 150° C. The longitudinal stretching ratio is generally in the range from 2.0:1 to 4.5:1, preferably from 2.5:1 to 4:1. The transverse stretching ratio is generally in the range from 2.5:1 to 4.5:1, preferably from 3.0:1 to 4:1.

Prior to the transverse stretching, one or both surfaces of the film may be in-line coated by known processes. The in-line coating may serve, for example, to give improved adhesion of any printing ink applied or of the hot-melt adhesive, or else to improve antistatic performance or processing performance. Typical coatings have adhesion-promoting, antistatic, slip-improving, or release action. Clearly, it is possible to apply these additional coatings to the film by way of in-line coating by means of aqueous dispersion prior to the transverse stretching step. Suitable polymers are acrylates, for example those described in WO 94/13476, hydrophilic polyesters (PET/IPA polyesters containing the sodium salt of 5-sulfoisophthalic acid) as described by way of example in EP-A-0 144 878 equivalent to U.S. Pat. No. 4,493,872, U.S. Pat. No. 4,252,885 or EP-A-0 296 620), polyurethanes, butadiene copolymers with acrylonitrile or methyl methacrylate, or an ester thereof.

For production of a film whose Δp is smaller than 0.14 it is advantageous that the area stretching factor (i.e. the product of longitudinal and transverse stretching ratio) is in the range from 9 to 15, preferably from 10 to 14, particularly preferably from 11 to 13.

In the heat-setting which follows, the film is kept for from about 0.1 to 10 s at a temperature of from 200 to 250° C., preferably from 210 to 245° C., particularly preferably from 220 to 240° C. (ambient temperature). Lower setting temperatures lead to excessive shrinkage and higher setting temperatures lead to possible loss of mechanical properties. The film is then wound conventionally.

After the biaxial stretching, it is preferable that one or both surfaces of the film is/are corona- or flame-treated by one of the known methods. The intensity of treatment is generally in the range above 45 mN/m.

It has been ensured that, during production of the film, a concentration of up to 60% by weight, based on the total weight of the film, of the regrind can be reintroduced into the extrusion process, without any significant resultant adverse effect on the physical properties of the film.

Properties

The film properties demanded are achieved via the inventive constitution of the film.

The table below (table 1) again collates the most important inventive properties of the film.

TABLE 1

| Property | Advantageous range | Preferred | Particularly preferred | Unit | Test method/comment |
|---|---|---|---|---|---|
| Water vapor barrier | <20 | <18 | <17 | g/(m² · d)H₂O | at 15 µm film thickness, 23° C., 50% r.h. (DIN 53122) |
| Oxygen permeation | <100 | <97 | <94 | cm³/(m² · d · bar) | at 15 µm film thickness (DIN 53380) |
| Hydrogen sulfide permeation | <860 | <850 | <840 | cm³/(m² · d · bar) | at 15 µm film thickness (DIN 53380) |
| Tensile strain at break in one direction | >150 | >160 | >170 | % | ISO 527-1/527-2 |
| Modulus of elasticity in one direction | <4500 >3000 | <4400 >3100 | <4300 >3200 | N/mm² | ISO 527-1 |
| Shrink in both directions | <1.8 >0 | <1.7 >0 | <1.6 >0 | % | DIN 40634 |
| Residual tensile strain | >40 | >45 | >50 | % | internal |
| Density | >1.388 <1.400 | >1.389 <1.399 | >1.390 <1.398 | g/cm³ | ASTM D1505-68 method C |
| Planar orienttation Δp | <0.140 | <0.135 | <0.130 | ./. | internal |
| $R_a$ | >35 <100 | >40 <90 | >45 <80 | nm | DIN 4762 cut-off 0.25 mm |
| $R_t$ | >350 <1500 | >450 <1400 | >550 <1300 | nm | DIN 4762 cut-off 0.25 mm |
| Haze | <10 | <9 | <8 | % | ASTM D1003-61 method A |
| Topography | 100-400 | 120-380 | 140-360 | elevations/mm² with height >0.5, <5 µm | internal |

Examples are used below for further illustration of the invention. The following test methods were used to determine properties:

Water Vapor Permeation

Water vapor permeation was measured at 23° C. and 50% r.h. to DIN 53122 on a film of thickness 15 μm.

Oxygen Permeation

Oxygen permeation was measured to DIN 53380 on a film of thickness 15 μm.

Hydrogen Sulfide Permeation

Hydrogen sulfide permeation was measured to DIN 53380 on a film of thickness 15 μm.

Tensile Strain at Break

Tensile strain at break in MD and TD was measured to ISO 527-1/527-2.

Modulus of Elasticity

Modulus of elasticity in MD and TD was determined to ISO 527-1.

Shrinkage

Shrinkage in both directions (MD and TD) was determined to DIN 40634.

Residual Tensile Strain

A strip of film of width 15 mm was cut from the film perpendicularly to the machine direction and clamped into a tensile-testing machine, the clamped length being 200 mm. The specimen was then subjected to strain at 20 mm/min, corresponding to 10%/min. Once 10% strain had been reached, i.e. when the specimen length was 220 mm, the specimen was automatically destressed at the same velocity. Residual tensile strain is the strain value when the force has returned to zero.

Density

Film density was determined to ASTM D1505-68 method C.

Planar Orientation Δp

Planar orientation is determined by measuring the refractive index with an Abbe refractometer.

| Preparation of specimens: | |
| --- | --- |
| Specimen size and length: | from 60 to 100 mm |
| Specimen width: | corresponds to prism width of 10 mm |

To determine $n_{MD}$ and $n_\alpha$ (=$n_z$), the specimen to be tested has to be cut out from the film with the running edge of the specimen running precisely in the direction TD. To determine $n_{TD}$ and $n_\alpha$ (=$n_z$), the specimen to be tested has to be cut out from the film with the running edge of the specimen running precisely in the direction MD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe, the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction. The scale is now turned using the lower knurled screw until the range visible in the eyepiece is from 1.49 to 1.50.

The refractive index $n_\alpha$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is placed on the crossing point of the two diagonal lines using the lower knurled screw, and the value indicated on the scale is read off and entered into the table.

The specimen is then turned, and the corresponding refractive indices $n_{MD}$ and $n_\alpha$ (=$n_z$) of the other side are measured and entered into an appropriate table.

After determining the refractive indices in, respectively, the direction MD and the direction of the thickness of the film, the specimen strip cut out in the direction MD is placed in position and the refractive indices $n_{TD}$ and $n_\alpha$ (=$n_z$) are determined accordingly. The strip is turned over, and the values for the B side are measured. The values for the A side and the B side are combined to give average refractive indices. The orientation values are then calculated from the refractive indices using the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

Roughness $R_a$ and $R_t$

Roughness values $R_a$ and $R_t$ were determined to DIN 4762 with a cut-off of 0.25 mm.

Haze

Haze was determined to ASTM D1003-61 method A.

Topography

A Wyko NT3300 white-light-interferometry microscope from Veeco was used to determine the topography of the surface. An area of 0.92 mm×1.21 mm (480×736 pixels) was measured with magnification of 5.1. For the measurement, the specimen was clamped into a ring (diameter 40 mm). The measurement was made in VSI mode (phase shifting interferometry). The measured length in the z direction was determined as 20 μm. Any unevenness of the sample was filtered out.

For analysis of the elevations, the technique known as multi-region analysis was used. In this, the measured area was studied to identify coherent regions whose height was more than 0.5 μm. However, the regions taken into account were only those whose size was at least 5 pixels. FIG. 1 shows an example.

Examples are used below for further illustration of the invention.

Example 1

The following starting materials were used to produce the film described below:
90% by weight of copolyester having 4.5% by weight of ethylene isophthalate and 95.5% by weight of ethylene terephthalate (Invista, Offenbach, Germany)
10% by weight of masterbatch, comprised of
  98.7% by weight of polyethylene terephthalate (Invista, Offenbach, Germany),
  1.0% by weight of anhydrous aluminum silicate ($d_{50}$=1.8 μm, SACHTOSIL® PV, Sachtleben, Duisburg, Germany), and
  0.3% by weight of amorphous silicon dioxide ($d_{50}$=4.3 μm, SYLOBLOC® CP4-8191, Grace, Worms, Germany)

The abovementioned raw materials were melted together in an extruder and mixed and extruded through a flat-film die onto a cooled take-off roll. The resultant amorphous prefilm was then sequentially biaxially stretched, set, and wound (final thickness of film 15 μm). The conditions in the individual steps of the process were:

| Longitudinal stretching: | |
|---|---|
| Temperature: | 80-120° C. |
| Longitudinal stretching ratio: | 3.2 |
| Transverse stretching: | |
| Temperature | 80-135° C. |
| Transverse stretching ratio: | 3.8 |
| Setting: | 2 s at 235° C. |

The properties of the resultant film are given in tables 2 and 3.

Example 2

The procedure was as described in example 1. The constitution of the raw materials was now as follows:
90% by weight of copolyester having 4.5% by weight of ethylene isophthalate and 95.5% by weight of ethylene terephthalate (Invista, Offenbach, Germany)
10% by weight of masterbatch, comprised of
  98.7% by weight of polyethylene terephthalate (Invista, Offenbach, Germany),
  1.0% by weight of calcium carbonate ($d_{50}$=1.2 μm, OMYALITE® 90, Omya GmbH, Germany), and
  0.3% by weight of amorphous silicon dioxide ($d_{50}$=4.3 μm, SYLOBLOC® CP4-8191, Grace, Worms, Germany)

The conditions in the individual steps of the process were:

| Longitudinal stretching: | |
|---|---|
| Temperature: | 80-120° C. |
| Longitudinal stretching ratio: | 3.5 |
| Transverse stretching: | |
| Temperature | 80-135° C. |
| Transverse stretching ratio: | 3.5 |
| Setting: | 2 s at 235° C. |
| Final thickness of film 15 μm. | |

The properties of the resultant film are given in tables 2 and 3.

Example 3

The procedure was as described in example 1. The constitution of the raw materials was now as follows:
90% by weight of copolyester having 4.5% by weight of ethylene isophthalate and 95.5% by weight of ethylene terephthalate (Invista, Offenbach, Germany)
10% by weight of masterbatch, comprised of
  98.7% by weight of polyethylene terephthalate (Invista, Offenbach, Germany),
  1.0% by weight of coated barium sulfate ($d_{50}$=1.4 μm, HOMBRIGHT® F, Sachtleben, Duisburg, Germany), and
  0.3% by weight of amorphous silicon dioxide ($d_{50}$=3.4 μm, SYLYSIA® 430, Fuji Sylysia, Japan)

The conditions in the individual steps of the process were:

| Longitudinal stretching: | |
|---|---|
| Temperature: | 80-120° C. |
| Longitudinal stretching ratio: | 3.3 |
| Transverse stretching: | |
| Temperature | 80-135° C. |
| Transverse stretching ratio: | 3.6 |
| Setting: | 2 s at 235° C. |
| Final thickness of film 15 μm. | |

The properties of the resultant film are given in tables 2 and 3.

Comparative Example 1

A film was produced as in example 1 of EP-A-586 161. The constitution of the raw materials was as follows:
Copolyester with 9 mol % of ethylene isophthalate and 91 mol % of ethylene terephthalate comprising
0.4% by weight of titanium dioxide ($d_{50}$=0.4 μm), and 0.01% by weight of amorphous silicon dioxide ($d_{50}$=1.3 μm)
Conditions in the individual steps of the process were:

| Longitudinal stretching: | |
|---|---|
| Temperature: | 80-125° C. |
| Longitudinal stretching ratio: | 3.0 |
| Transverse stretching: | |
| Temperature | 80-130° C. |
| Transverse stretching ratio: | 3.0 |
| Setting: | 2 s at 170° C. |

The final thickness of the film was 25 μm. The roughness of this film is very low, and this gives difficulties in processing. The shrinkage is moreover excessive.

TABLE 2

| Example | IPA content [%] | Median diameter of particles I [μm] | Median diameter of particles II [μm] |
|---|---|---|---|
| 1 | 4.05 | 4.3 | 1.8 |
| 2 | 4.05 | 4.3 | 1.2 |
| 3 | 4.05 | 3.4 | 1.4 |
| comp. 1 | 9.0 | 1.3 | 0.4 |

TABLE 3

| Example | Water vapor permeation [g/(m²·d)] | Oxygen permeation [cm³/(m²·d·bar)] | Hydrogen sulfide permeation [cm³/(m²·d·bar)] | Tensile strain at break MD [%] | Modulus of elasticity MD [N/mm²] | Shrinkage MD/TD [%] | Residual tensile strain [%] | Density [g/cm³] | Δp | $R_a$ [nm] | $R_t$ [nm] | Haze [%] | Topography [elevations >0.5, <5 μm/mm²] |
|---|---|---|---|---|---|---|---|---|---|---|---|---|---|
| 1 | 16.3 | 92 | 830 | 190 | 4050 | 1.0/0.8 | 55 | 1.392 | 0.124 | 50 | 1050 | 5.2 | 182 |
| 2 | 16.1 | 91 | 825 | 175 | 4180 | 1.1/0.7 | 54 | 1.393 | 0.127 | 51 | 1090 | 5.1 | 169 |
| 3 | 16.5 | 93 | 838 | 185 | 4110 | 1.0/0.9 | 52 | 1.391 | 0.123 | 45 | 950 | 5.0 | 148 |
| comp. 1 | 16.9 | 98 | 850 | 195 | 3700 | 1.8/2.1 | 56 | 1.390 | 0.121 | 25 | 300 | 5.3 | 0 |

The invention claimed is:

1. A biaxially oriented polyester film, comprising at least 80% by weight of ethylene-terephthalate-derived units and of from 1 to 8% by weight of ethylene-isophthalate-derived units (based in each case on the total weight of polyester), said film further comprising from 0.01 to 0.5 weight percent, based on the weight of the layer, of first particles whose median diameter $d_{50}$ is from 0.1 to 2.0 μm, and from 0.01 to 0.5 weight percent, based on the weight of the layer, of second particles whose median diameter $d_{50}$ is from >2.5 μm to <8 μm, wherein said film exhibits (i) a roughness $R_a$ of greater than 35 nm and less than 100 nm, as measured via DIN 4762 with a cut-off of 0.25 mm, and (ii) a water vapor permeation of less than 20 gm/(m²·d)H₂O based on 15 micron film thickness, 23° C., 50% r.h. measured via DIN 53122.

2. A metal laminate comprising sheet metal and a film as claimed in claim 1.

3. The metal laminate as claimed in claim 2, said laminate further comprising an adhesive between the sheet metal and the film.

4. The metal laminate as claimed in claim 3, wherein the adhesive is a moisture-curing polyurethane adhesive.

5. A molding comprising a metal laminate as claimed in claim 2.

6. A method of laminating sheet metal comprising combining or adhesive-bonding a film as claimed in claim 1, with sheet metal.

7. A biaxially oriented polyester film as claimed in claim 1, wherein said first particles have a median diameter $d_{50}$ of from 1.2 microns to 2.0 microns, and said second particles have median diameter $d_{50}$ of from 3.4 microns to <8 μm.

* * * * *